United States Patent [19]

Mate et al.

[11] Patent Number: 4,701,507

[45] Date of Patent: Oct. 20, 1987

[54] PROCESS FOR THE INCORPORATION OF FUNCTIONALIZED MONOMERS

[75] Inventors: Robert D. Mate, Stow; Dane K. Parker, Massillon; James C. Blackwell, Tallmadge, all of Ohio

[73] Assignee: The Goodyear Tire & Rubber Company, Akron, Ohio

[21] Appl. No.: 869,476

[22] Filed: Jun. 2, 1986

[51] Int. Cl.$^4$ ............................................... C08F 2/24
[52] U.S. Cl. ................................... 526/208; 526/225
[58] Field of Search ............... 526/208, 225, 209, 217

[56] References Cited

U.S. PATENT DOCUMENTS 3,767,628  10/1973  Kline .................................. 526/307
4,521,574  6/1985  Patterson .......................... 526/204

Primary Examiner—Christopher Henderson
Attorney, Agent, or Firm—D. O. Nickey

[57] ABSTRACT

A process for the emulsion copolymerization of functionalized monomers wherein the improvement comprises the use of methyl isobutyl ketone (MIBK) as a solvent and elevated soap levels in the polymerization.

6 Claims, No Drawings

PROCESS FOR THE INCORPORATION OF FUNCTIONALIZED MONOMERS

TECHNICAL FIELD

This invention is concerned with the copolymerization of functionalized monomers. It has been discovered that use of methyl isobutyl ketone (MIBK) as a solvent and elevated soap levels in an emulsion polymerization provides for high levels of incorporation of functionalized monomers into a polymer.

BACKGROUND OF THE INVENTION

One approach to the utilization of polymer-bound rubber chemicals is to prepare a masterbatch rubber and then blend down to the desired level with the rubber in which the chemical is intended to function. In the case of rubbers prepared in aqueous emulsions or already existing in a latex form, the blending is preferably done at the latex stage. The blending may also be conducted in the dry rubber state using conventional mixing techniques common to the rubber industry.

There exists the need to prepare polymers with high levels of polymer-bound rubber chemicals. One route to such highly loaded polymers entails the use of copolymerizable functionalized monomers. Many copolymerizable monomers having rubber chemical functionality are polar, high melting solids which are only slightly soluble in the monomers typically employed to prepare rubbers, i.e. butadiene, isoprene, styrene or acrylonitrile. The solubility of these chemicals limits the level to which they can be copolymerized and thus the extent to which they may be utilized in the masterbatch blending technique.

U.S. Pat. Nos. 3,658,769, 3,767,628 and 4,213,892 describe the preparation of compounds such as N-(4-anilinophenyl)methacrylamide and N-(4-anilinophenyl)acrylamide and the polymerization of such compounds with typical monomers. It is apparent from these patents that the copolymerizable antioxidants could only be incorporated into the polymers at relatively modest levels which, although sufficient to confer good age resistance or oxidation protection to the rubbers, are not high enough for practical use in masterbatch blending techniques. These references disclose that a solvent such as methyl ethyl ketone or isopropyl alcohol may be required to obtain adequate solubility of the monomers as well as to solubilize other ingredients where required. The references do not suggest that the use of MIBK in conjunction with elevated soap levels would provide for unexpectedly high levels of incorporation of functionalized monomers in emulsion polymerizations.

U.S. Pat. No. 4,521,574 discloses the use of dichloromethane (DCM) and/or tetrahydrofuran (THF) as cosolvents in an emulsion polymerization; however, DCM and THF have been determined to be a potential environmental and health concern.

The prior art has suggested the use of methyl ethyl ketone as a cosolvent to promote the incorporation of functionalized monomers; however, due to methyl ethyl ketones solubility in water, it was determined that use of methyl ethyl ketone resulted in a two phase system that is highly undesirable. It has been discovered that the use of MIBK does not result in a two phase system and thus forms a portion of the instant invention.

DISCLOSURE OF THE INVENTION

A process for the copolymerization of functionalized monomers in an emulsion polymerization, the improvement comprising the use of MIBK as a cosolvent with elevated levels of ionic soaps. There is also disclosed a process for preparing polymers that have attached thereto rubber chemical functionalities which comprises the emulsion polymerization of monomers with a functionalized monomer that contains a polymerizable vinyl group, in the presence of a free radical, the improvement comprising the use of 40 to 80 parts of MIBK as a cosolvent based on total monomer charge, in conjunction with elevated levels of ionic soaps. Further, there is disclosed a process for the incorporation of copolymerizable antioxidants into emulsion rubbers comprising use of a cosolvent, wherein said cosolvent is MIBK and wherein said copolymerizable antioxidant is selected from the group consisting of (A) amides having the following structural formula:

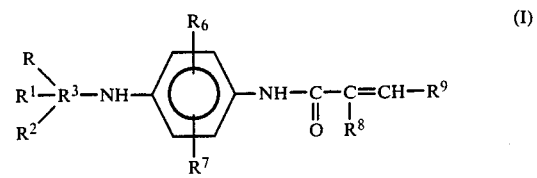

wherein $R^3$ is an aryl radical, R and $R^1$ are selected from the group consisting of hydrogen, alkyl radicals having from 1 to 4 carbon atoms and alkoxy radicals having from 1 to 4 carbon atoms, $R^2$ is selected from the group consisting of hydrogen, alkyl radicals having from 1 to 4 carbon atoms, alkoxy radicals having from 1 to 4 carbon atoms and a radical having the following structural formula:

wherein $R^4$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^5$ is selected from the group consisting of hydrogen and alkyl radicals having from 1 to 12 carbon atoms and wherein $R^6$ and $R^7$ are alkyl radicals having from 1 to 4 carbon atoms, $R^8$ is selected from the group consisting of hydrogen, methyl and ethyl; and $R^9$ is hydrogen or phenyl; and (B) imides selected from the group consisting of (1) compounds having the following structural formula:

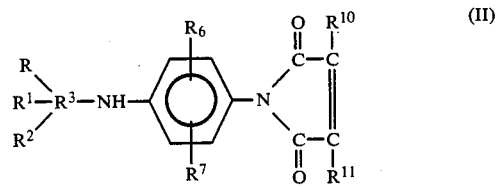

wherein R, $R^1$, $R^2$, $R^3$, $R^6$ and $R^7$ are as previously defined herein under structural Formula I and wherein $R^{10}$ and $R^{11}$ are selected from the group consisting of hydrogen and alkyl radicals having from 1 to 4 carbon atoms and (2) compounds having the following structural formula:

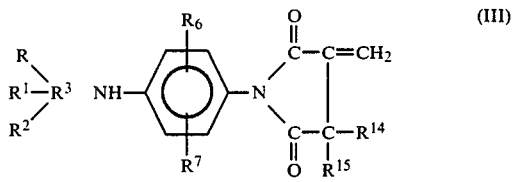

wherein R, $R^1$, $R^2$, $R^3$, $R^6$ and $R^7$ are as previously defined herein under structural Formula I and wherein $R^{14}$ and $R^{15}$ are selected from the group consisting of hydrogen and alkyl radicals having from 1 to 4 carbon atoms.

BEST MODE OF CARRYING OUT THE INVENTION

U.S. Pat. Nos. 3,658,789 and 3,767,628 herein incorporated by reference disclose various amide and imide age resisters which are copolymerized with conventional monomers in a free radical polymerization.

U.S. Pat. No. 4,213,892, also herein incorporated by reference, discloses a process for preparing oxidatively stable polymers which comprises reacting the polymer with an antioxidant in the presence of a free radical. We have unexpectedly found that use of MIBK as a cosolvent in an emulsion polymerization and in conjunction with elevated levels of ionic soaps will provide for higher levels of incorporation of the functionalized monomer without the attendant concerns for environmental and worker safety.

The use of a cosolvent such as MIBK thus overcomes the inherent limitations of such monomers containing rubber chemical functionality and allows for incorporation at high levels in emulsion polymerizations. The MIBK may be stripped from the latex after polymerization is completed if desired.

Conventional emulsion recipes are employed with the present invention, however, some restrictions and modifications arise either from the cosolvent, the co-polymerizable rubber chemical (functionalized monomer) itself, or the polymerization parameters. Ionic surfactants, known in the art, such as sulfonate detergents or carboxylate soaps are useful in the instant invention.

Nonionic surfactants such as polyethers fail to form emulsions in the presence of the cosolvent and thus are unsuitable in the process of the present invention.

The level of surfactant or soap is computed based upon the total of the organic components (monomers plus cosolvents) and ranges from 8 to 30 parts ionic soap per 100 parts of organic components with 10–25 parts being more preferred and 10–15 parts being most preferred. Those skilled in the art will appreciate that these levels are higher than usually used.

Free radical initiators known in the art are useful in the instant invention, however, initiators which are strong oxidizing agents, such as persulfates, cannot be used with certain functionalized monomers, i.e. those functionalized monomers that contain moieties which are readily oxidizable.

The applicant has found that hot polymerization recipes, 50° to 100° C., are preferred over cold ones, −10° to 15° C. Preferably the polymerization is carried out to complete monomer conversion in order to incorporate essentially all of the functionalized monomer. Incremental addition, or the use of high levels of a chain transfer agent may be necessary in order to avoid excessive gel formation. Incremental addition of the comonomer(s) may be necessary for complete incorporation of the functionalized monomer. Such minor modifications are within the skill of the artisan.

Through the process of the instant invention high level incorporation of numerous functionalities can be accomplished. Thus, polymers can be prepared which have high levels of covalently bonded functionalities. Representative of the functionalities that can be incorporated into a polymer include accelerators, metal deactivators, photosensitizers, pigments, synergists, catalysts and antioxidants, or combinations thereof.

Representative of functionalized monomers that can be copolymerized to high levels through the process of the instant invention include antioxidants such as:

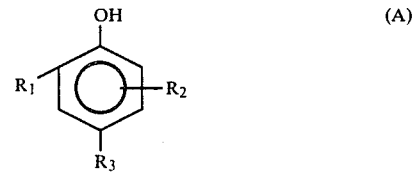

wherein $R_1$ and $R_2$ are tert-alkyl radicals from 4 to 8 carbon atoms, $R_3$ is selected from the group of radicals:

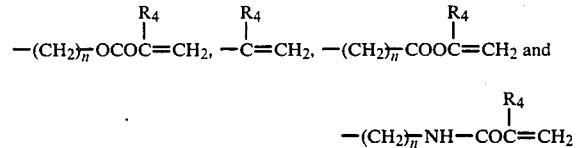

wherein $R_4$ is hydrogen or methyl and n is 0 to 3; and compounds such as:

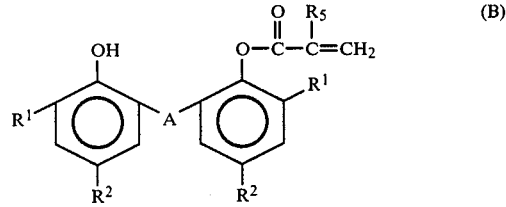

wherein $R^1$ and $R^2$ are selected from n-alkyl radicals from 1–18 carbons and secondary alkyl radicals from 3–18 carbon atoms, and t-alkyl radicals from 4–8 carbon atoms; $R^5$ is H, $CH_3$ or $C_2H_5$ and A is selected from the radicals:

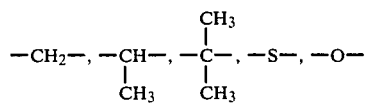

and compounds such as:

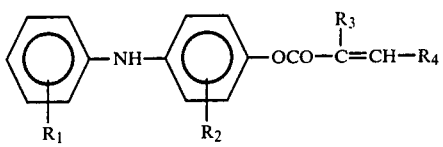
(C)

and

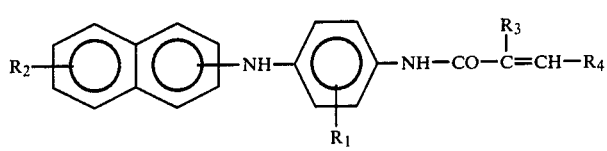
(D)

and

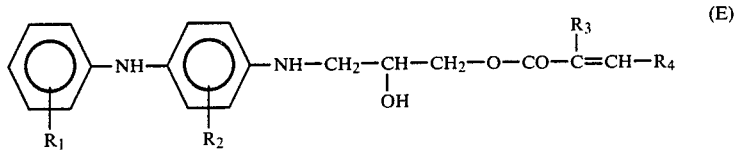
(E)

where each of $R_1$ and $R_2$ are alkyl radicals of 1 to 4 carbon atoms, $R_3$ is hydrogen or methyl and $R_4$ is H or phenyl.

Other functionalized monomers useful in the instant invention include polymerizable synergists such as:

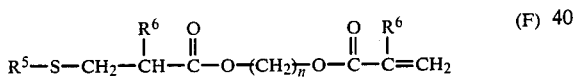
(F)

wherein $R^5$ is alkyl, aryl or substituted phenyl; $R^6$ may be independently hydrogen, methyl, ethyl or phenyl radicals, and n is 1 10 and compounds such as:

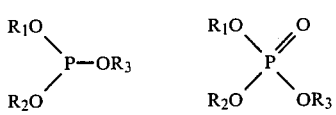
(G)

wherein $R_1$, $R_2$, and $R_3$ are selected from alkyl radicals of 1 to 20 carbon atoms, aralkyl of 7 to 20 carbon atoms, aryl of 7 to 20 carbon atoms and alkylene of 2 to 20 carbon atoms with proviso that one of the R groups contains a polymerizable vinyl group, for example a compound such as:

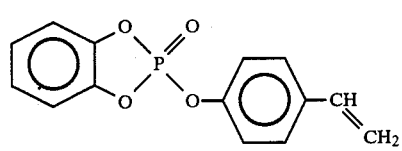
(H)

is useful in the instant invention. Suitable unsaturated UV screening agents such as:

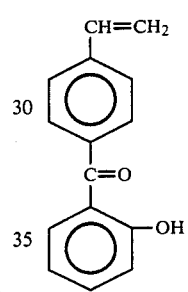
(I)

or

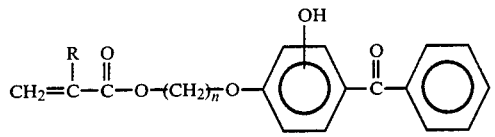

can be used in the present invention. Unsaturated triplet quenching agents such as:

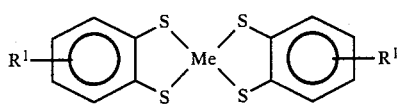
(J)

wherein Me is selected from Ni, Co and Pd and $R^1$ is a hydrocarbon radical that contains a polymerizable vinyl group, are useful in the instant invention.

The aforementioned functionalized monomers may be polymerized by well known free radical polymerization techniques with one or more comonomers that are known to polymerize in free radical initiated polymerization systems. The polymerizations may be carried out in emulsion or suspension type systems. Some adjustments in the polymerization recipe and/or reaction conditions may be necessary to obtain a satisfactory rate of polymer formation, depending on the amount of functionalized monomer included and the other monomers involved. These adjustments should be minimal when using the process of the instant invention and would be within the skill of the artisan.

Examples of free radical initiators that are useful in the practice of this invention are those known as "Redox" initiators, such as appropriate combinations of chelated iron salts, sodium formaldehyde sulfoxylate and organic hydroperoxides such as cumene and paramethane hydroperoxides. "Azo" initiators, such as azobisisobutyronitrile are preferred.

Examples of comonomers that are useful in the practice of this invention are conjugated diene monomers such as butadiene-1,3; 2-chlorobutadiene-1,3-isoprene, piperylene, and conjugated hexadienes; and vinyl monomers such as styrene, α-methylstyrene, divinyl benzene, vinyl chloride, vinyl acetate, vinylidene chloride, methyl methacrylate, ethyl acrylate, vinylpyridine, acrylonitrile, methacrylonitrile, methacrylic acid and acrylic acid. Mixtures of different functionalized monomers and mixtures of different comonomers may be used. The monomer charge ratio is normally from about 0.10/99.9 to 100/0 functionalized monomer/comonomers. A charge ratio of about 5/95 to about 80/20 is preferred with 10/90 to 40/60 the most preferred. Ratios will vary depending on the amount of rubber chemical functionality desired to be incorporated and on the reactivity ratios of the monomers in the particular polymerization system used.

The present invention has particular utility in preparing polymers that have chemically bonded antidegradants. To afford adequate protection against degradation the polymer should contain from about 0.10 part to about 10.0 parts by weight of the segmeric form of the antidegradant per 100 parts by weight of the polymer, although from 0.50 to 5.0 parts is normally satisfactory, with from 0.50 to 3.0 parts being preferred.

As the amount of bound age resister increases, the physical characteristics of the polymer are altered accordingly. Where it is desired to produce a polymer which is self stabilizing and which substantially retains the physical properties of the comonomer or comonomers, normally the polymer should contain no more than about 10.0 parts by weight of the antidegradant segmeric unit. Such polymers preferably are solid, although they may be liquid. Where it is desired that the polymer act as a polymeric age resister which may be blended with unstabilized polymers the polymer should normally contain greater amounts of the monomeric age resister, e.g., from 10 up to 100 parts. The remainder of the polymer is comprised preferably of the segmeric form of at least one conjugated diene monomer and/or the segmeric form of at least one vinyl monomer. Preferably the polymers contain at least 50 percent by weight of the segmeric form of a conjugated diene such as butadiene-1,3 or isoprene.

The following examples exemplify the present invention and are not intended to limit the scope thereof.

EXAMPLES 1-6

A series of $9.6 \times 10^{-4}$ m$^3$ (thirty-two ounce) bottles were charged with the following per 100 parts by weight of total monomers (butadiene plus functionalized monomer). Total monomer charge was 150 g.

| water | 240 parts |
|---|---|
| trisodium phosphate | 0.5 parts |
| azobisisobutyronitrile | 0.8 parts |
| tert-dodecylmercaptan | 0.6 parts |

Table I sets out the levels of the monomers, cosolvent and soap added to the bottles in parts per hundred based on total monomers. The functionalized monomer was the monomeric antioxidant N-(4-anilinophenyl)methacrylamide.

TABLE I

| Example | Antioxidant** | Butadiene | MIBK | Soap* |
|---|---|---|---|---|
| 1 | 40 | 60 | 80 | 20 |
| 2 | 40 | 60 | 70 | 17.5 |
| 3 | 40 | 60 | 60 | 15 |
| 4 | 40 | 60 | 50 | 12.5 |
| 5 | 40 | 60 | 40 | 10 |
| 6 | 40 | 60 | 30 | 7.5 |

*sodium dodecylbenzenesulfonate
**N—(4-anilinophenyl)methacrylamide

The bottles were tumbled in a water bath at 60° C. for 15½ hours, which resulted in 95% or greater monomer conversion.

EVALUATION OF POLYMER LATICES PREPARED IN EXAMPLES 1-6

Portions of each latex sample were analyzed for solids content before and after stripping of the latex. Table II sets out the parts of MIBK charged to the reactor and the percent solids before and after stripping.

TABLE II

| Example Polymer | Parts MIBK Charged | % Solids Before Stripping | % Solids After Stripping |
|---|---|---|---|
| 1 | 80 | 26.1 | 26.1 |
| 2 | 70 | 26.8 | 25.4 |
| 3 | 60 | 26.6 | 27.3 |
| 4 | 50 | 26.5 | 26.3 |
| 5 | 40 | 28.0 | 26.9 |
| 6 | 30 | 27.3 | 26.9 |

The data in Table II indicates that the instant invention provides a method for the virtually quantitative incorporation of a functionalized monomer.

COMPARATIVE EXAMPLE

The procedure and charge of Example 6 was repeated with the exception that methyl ethyl ketone (MEK) was substituted for the MIBK. The hot polymerization yielded phase separation which is very undesirable. Analysis indicated 3.4% nitrogen in the polymer. This is to be contrasted with Example 6 with MIBK as the cosolvent wherein 4.15% nitrogen was found and there was no phase separation. Thus, with MIBK as the cosolvent, 94% of the functionalized monomer was incorporated contrasted with 77% incorporation with MEK.

EXAMPLE 7

A 0.038 m$^3$ (ten gallon) glass-lined steel reactor was charged with:

| water | 240 parts |
|---|---|
| trisodium phosphate | 0.5 parts |
| sodium dodecylbenzene-sulfonate | 20 parts |

Parts by weight based on a total monomer charge of 11 kg.

The reactor was sealed and flushed with nitrogen. 40 parts of N-(4-anilinophenyl)methacrylamide was dissolved in 80 parts of MIBK then 1.2 parts of azobisisobutyronitrile and 0.4 parts of t-dodecylmercaptan were dissolved in the MIBK solution. The solution was then charged to the reactor. 60 parts of butadiene was charged to the reactor and the contents heated to 60° C. with stirring. After 11 hours, a solids determination indicated 27.3% solids. The MIBK was stripped under vacuum to yield the product latex.

EXAMPLES 8 AND 9

Examples 8 and 9 correspond, respectively, to Examples 4 and 6 of Table I except that isoprene is substituted for butadiene and 20 parts of soap was used in both Examples. Otherwise the amounts and components are as in the respective earlier Examples. The polymerization time is 25 hours and solids measurements indicated essentially complete monomer conversion.

EXAMPLES 10-11

Two $1.2 \times 10^{-4}$ m$^3$ (four ounce) bottles are charged with the following per 100 parts by weight of total monomers. The total monomer charge is 12.5 gms.

| | |
|---|---|
| trisodium phosphate decahydrate | 0.5 parts |
| azobisisobutyronitrile | 1.5 parts |
| water | 385.0 parts |
| sodium dodecylbenzenesulfonate | 16.0 parts |
| compound C* | 20.0 parts |
| styrene | 20.0 parts |
| MIBK | 60.0 parts |
| t-dodecylmercaptan | 1.0 parts |
| butadiene | 60.0 parts |

*Compound C

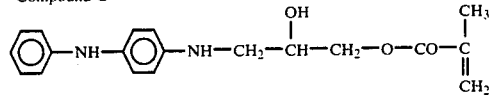

The bottles are tumbled in a rotary water bath at 60° C. for 24 hours. No butadiene pressure is detected, thus indicating essentially complete conversion of butadiene. Latices are coagulated in excess methanol to isolate the rubber. Samples 10 and 11 are then continuously extracted with hot methanol for 24 hours to remove any unpolymerized monomers. Almost quantitative polymer yield indicates very high incorporation of the antioxidant monomer.

Industrial Applicability

The present invention provides a method for the high loading of polymers with chemical functionality that can be used as masterbatches. These masterbatches can be blended with unfunctionalized polymer to achieve a final product containing appropriate amounts of the desired rubber chemical or chemicals. Industrial production of polymers having the desired amount of bound rubber chemical is not economic or practical. The functionalized monomers cause problems in production facilities and thus the instant invention provides an economic and efficient method wherein bound chemical functionalities can be incorporated into polymers in high levels to produce masterbatches which can then be used on a commercial production scale.

While certain representative embodiments and details have been shown for the purpose of illustrating the invention, it will be apparent to those skilled in this art that various changes and modifications may be made therein without departing from the scope of the invention.

What is claimed is:

1. A process for forming a polymer comprising the aqueous emulsion polymerization of:
   (A) at least one functionalized monomer that contains a polymerizable vinyl group; with
   (B) at least one copolymerizable conjugated diene monomers selected from the group consisting of butadiene-1,3, 2-chlorobutadiene-1,3, isoprene, piperylene and conjugated hexadienes; and optionally
   (C) at least one vinyl monomer selected from the group consisting of styrene, α-methylstyrene, divinylbenzene, vinyl chloride, vinyl acetate, vinylidene chloride, methyl methacrylate, ethyl acrylate, vinylpyridine, acrylonitrile, methacrylonitrile, methacrylic acid and acrylic acid;
   the ratio of functionalized monomer to conjugated diene to vinyl monomer can range from 5:75:20 to 95:5:0 parts per hundred based on total monomers
   the improvement comprising polymerizing the monomers in the presence of from 8 to 30 parts of an ionic soap per 100 parts of total organic components, (monomers and cosolvents) and 40–80 parts of MIBK based on 100 parts of total monomers.

2. A process according to claim 1 wherein the functionalized monomer is selected from 3-N-(4'-anilinophenyl)amino-2-hydroxypropyl methacrylate and N-(4-anilinophenyl)methacrylamide.

3. A process according to claim 1 wherein at least one functionalized monomer is from the group consisting of (A) amides having the structural formula:

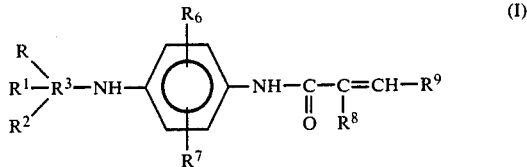

wherein R$^3$ is an aryl radical, R and R$^1$ are selected from the group consisting of hydrogen, alkyl radicals having from 1 to 4 carbon atoms and alkoxy radicals having from 1 to 4 carbon atoms, R$^2$ is selected from the group consisting of hydrogen, alkyl radicals having from 1 to 4 carbon atoms, alkoxy radicals having from 1 to 4 carbon atoms and a radical having the following structural formula:

wherein R$^4$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and R$^5$ is selected from the group consisting of hydrogen and alkyl radicals having from 1 to 12 carbon atoms and wherein R$^6$ and R$^7$ are hydrogen or alkyl radicals having from 1 to 4 carbon atoms, R$^8$ is selected from the group consisting of hydrogen, methyl and ethyl; and R$^9$ is hydrogen or phenyl; and (B) imides selected from the group consisting of (1) compounds having the following structural formula:

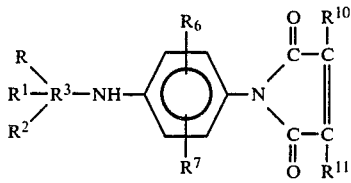

(II)

wherein R, $R^1$, $R^2$, $R^3$, $R^6$ and $R^7$ are as previously defined herein under structural Formula I and wherein $R^{10}$ and $R^{11}$ are selected from the group consisting of hydrogen and alkyl radicals having from 1 to 14 carbon atoms and (2) compounds having the following structural formula:

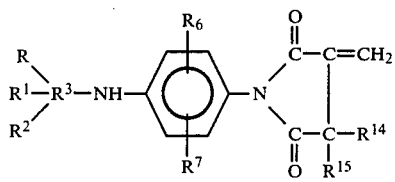

(III)

wherein R, $R^1$, $R^2$, $R^3$, $R^6$ and $R^7$ are as previously defined herein under structural Formula I and wherein $R^{14}$ and $R^{15}$ are selected from the group consisting of hydrogen and alkyl radicals having from 1 to 4 carbon atoms.

4. A process according to claim 1 wherein the functionalized monomer is selected from the group of compounds represented by the structural formula:

wherein $R_1$ and $R_2$ is a tert-alkyl radical from 4 to 8 carbon atoms, $R_3$ is selected from the group of radicals:

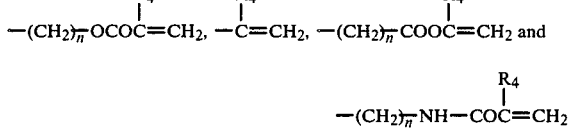

wherein $R_4$ is hydrogen or methyl and n is 0 to 3; and compounds with the structural formula:

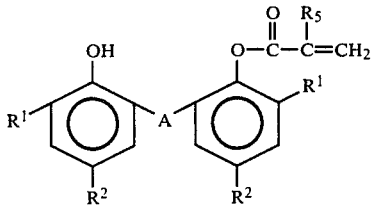

(B)

wherein $R^1$ and $R^2$ are selected from n-alkyl radicals from 1–18 carbons and secondary alkyl radicals from 3–18 carbon atoms, and t-alkyl from 4–8 carbon atoms; $R^5$ is H, $CH_3$ or $C_2H_5$ and A is selected from the radicals:

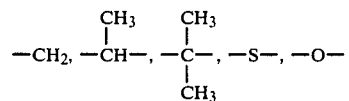

and compounds with the structural formula:

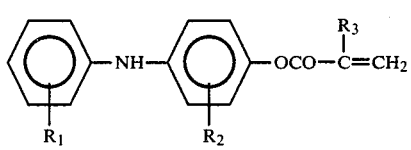

(C)

and

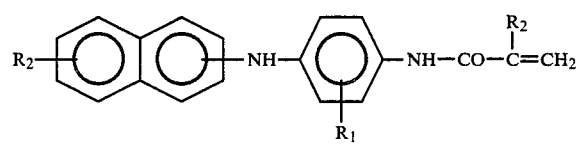

(D)

and

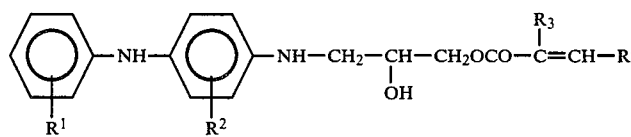

(E)

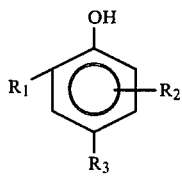

(A)

where each of $R_1$ and $R_2$ are alkyl radicals of 1 to 4 carbon atoms, $R_3$ is hydrogen or methyl, and $R^4$ is hydrogen or phenyl; and compounds with the structural formula:

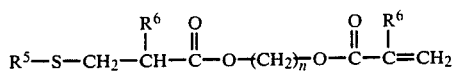 (F)

wherein $R^5$ is alkyl, aryl or substituted phenyl; $R^6$ may be independently hydrogen, methyl, ethyl, or phenyl radicals, and n is 1 to 10; and compounds with the structural formula:

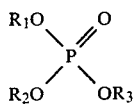 (G)

wherein $R_1$, $R_2$ and $R_3$ can be the same or different radicals selected from the group consisting of alkyl radicals of 1 to 20 carbon atoms, aralkyl radicals of 7 to 20 carbon atoms, aryl radicals of 7 to 20 carbon atoms and alkylene radicals of 2 to 20 carbon atoms, with the proviso that one of the R groups contain a polymerizable vinyl group; and compounds of the structural formula:

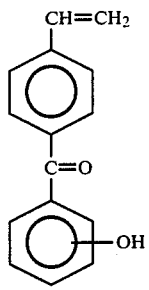 (H)

and;

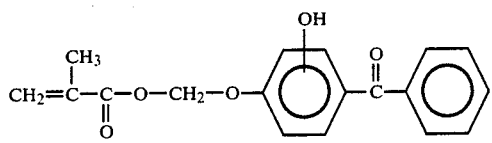 (I)

and compounds of the structural formula:

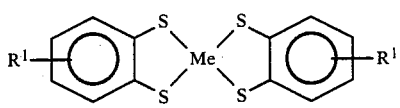 (J)

wherein $R^1$ is a hydrocarbon radical that contains a polymerizable vinyl group and Me is selected from the group consisting of nickel, cobalt and palladium.

5. A process according to claim 1 wherein the conjugated diene monomer is butadiene-1,3, and ratio of functionalized monomer to conjugated diene to vinyl monomer ranges from 15:75:10 to 50:50:0.

6. A process according to claim 1 wherein the functionalized monomer has a moiety selected from the group consisting of antioxidants, metal deactivators, photosensitizers, pigments, synergists and catalysts.

* * * * *